INVENTOR.
EINAR T. YOUNG
BY George L. Church
ATTORNEY

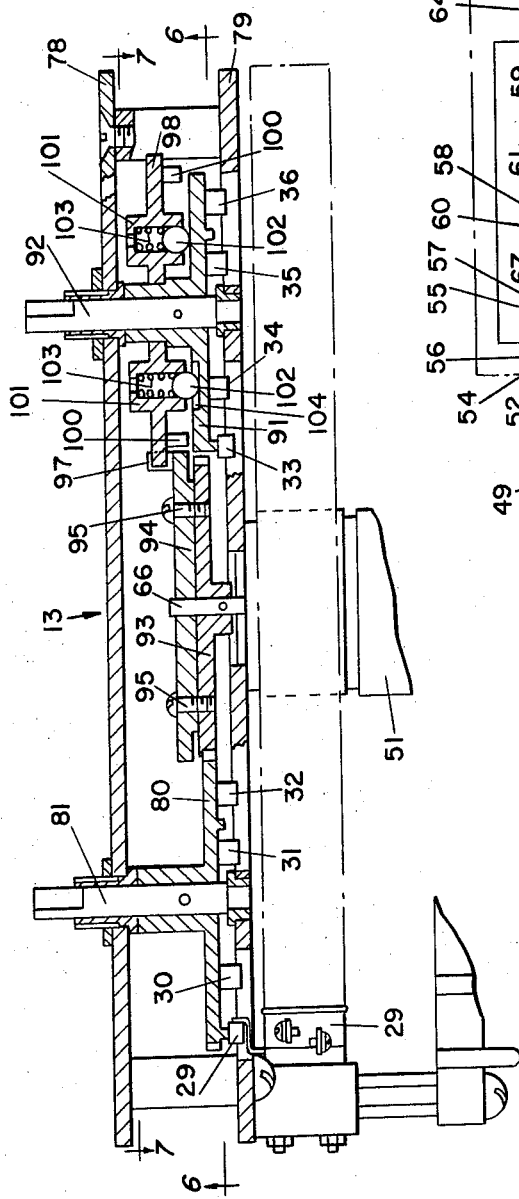

United States Patent Office 3,249,115
Patented May 3, 1966

3,249,115
FLUID PROPORTIONING SYSTEM WITH AUTOMATIC CONTROL
Einar T. Young, Newtown Square, Pa., assignor to Sun Oil Company, Philadelphia, Pa., a corporation of New Jersey
Filed May 14, 1962, Ser. No. 194,517
6 Claims. (Cl. 137—92)

This invention relates to a fluid proportioning system, and more particularly to a system for continuously proportioning two or more different fluids flowing in pipes or conduits which all reach a common point, thereby to produce a blend of the several fluids. The system of this invention includes an automatic control arrangement whereby a measured physical characteristic (e.g., the viscosity) of the blend is maintained substantially constant, by automatic adjustment of the proportions of the major fluid component in the blend, as the physical characteristic deviates from the desired value.

Speaking generally, this invention may be considered to be an improvement over that disclosed in my copending application Serial No. 180,211, filed March 16, 1962.

An object of this invention is to provide a novel fluid blending system having embodied therein an automatic control feature.

Another object is to provide a fluid blending system having therein an arrangement for automatically controlling the viscosity of the blend so as to maintain it substantially constant.

A further object is to provide a fluid blending system which includes an arrangement for automatically varying the proportions of one of the components of the blend, in accordance with and in response to changes in a physical characteristic of the blend.

The objects of this invention are accomplished, briefly, in the following manner: A master pulse generator, which generates a plurality of pulses during a time interval whose length can be adjusted, provides the master control of the system. A plurality of controllers, one for each different fluid, receive pulses from the pulse generator; each of these controllers is adjustable manually to pass to its output, during the aforesaid time interval, a selected fraction of the total pulses generated during such time interval. These controllers comprise switches marked in percentages, and may be thought of as percentage switches. For effecting a control of the proportioning or blending, the pulses passed by each controller (percentage switch) are applied to respective differential devices, in one particular sense; pulses recurring at a rate proportional to the flow rate of a respective fluid are applied to the differential devices for the corresponding fluid, in a sense opposite to that of the controller pulses for the same fluid. The outputs of the respective differential devices are used to individually control the flows of the various fluids.

An automatic percentage control unit (to be hereinafter referred to as an APC unit), which is functionally similar to the percentage switches (controllers) mentioned but whose internal construction is quite different, is switchable into the proportioning system, as a substitute for a selected one of the percentage switches (manually-adjustable controllers). The APC unit (controller) is manually adjustable, like the percentage switches, but in addition is adjustable in stepwise fashion, by a motor, to vary the number of pulses passed to its output during the basic time interval. A transducer senses a physical characteristic (e.g., the viscosity) of the fluid blend and develops a voltage in response to variations in such characteristic from a predetermined value; the voltage developed is caused, through electrical circuitry, to control the stepping motor of the APC unit, thereby to step the latter in one direction or the other (and thus to vary the number of pulses applied during the basic time interval to the corresponding differential device, thereby varying the flow of the corresponding fluid) according to the sense of the variation in physical characteristic. In this way, automatic control of the physical characteristic of the fluid blend is effected, so as to maintain such characteristic substantially constant.

A detailed description of the invention follows, taken in conjunction with the accompanying drawings, wherein:

FIG. 4 is a circuit diagram of the automatic control portion of FIG. 1;

FIG. 5 is a vertical section through an APC unit of the invention;

Figure 1:
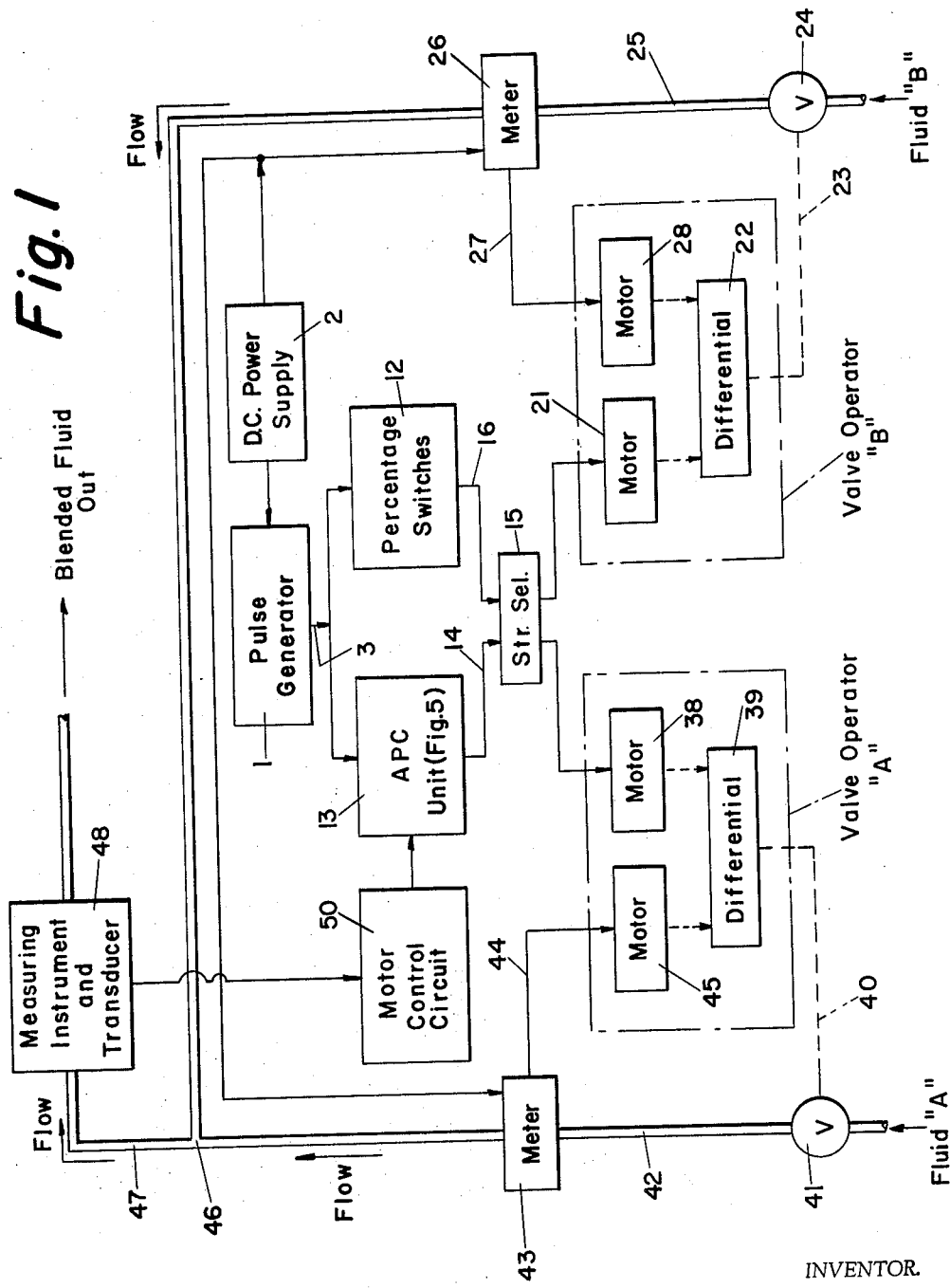
FIG. 1 is a simplified block diagram of a proportioning system according to this invention.

FIG. 1 is a block diagram of a proportioning system according to the invention. A pulse generator 1 provides the master control for the proportioning system. Pulse generator 1 generally comprises a plurality of single-pole, single-throw switches all having their contacts fed, either directly or indirectly, from a direct current power supply 2. Each of the aforesaid switches controls a separate series circuit from the power supply, so that the closure of any one of these switches results in a voltage pulse (derived from the power supply or power source 2) appearing at the pulse generator output, which latter is denoted generally by numeral 3. For simplicity, only a single output is shown for the pulse generator in FIG. 1, although there are actually eight output terminals on pulse generator 1.

The switches of pulse generator 1 are preferably of the magnetically-operated proximity type, arranged to be operated by bringing a permanent magnet into proximity with the switch. The switches are arranged in two circular arrays, each array being operated by a respective magnet and the two magnets being rotated at different speeds, the speeds of rotation of the magnets having a ratio of 10:1, for example. The number of switches, their arrangement into circular arrays, and their electrical interconnections (among themselves and to the output terminals of the pulse generator) are such that during a unit or basic time interval (corresponding to one complete revolution of the slower-speed magnet, or ten revolutions of the faster magnet) a fixed, predetermined number of output pulses will appear at each of the eight output terminals (see FIG. 2) of the pulse generator 1.

Figure 2:
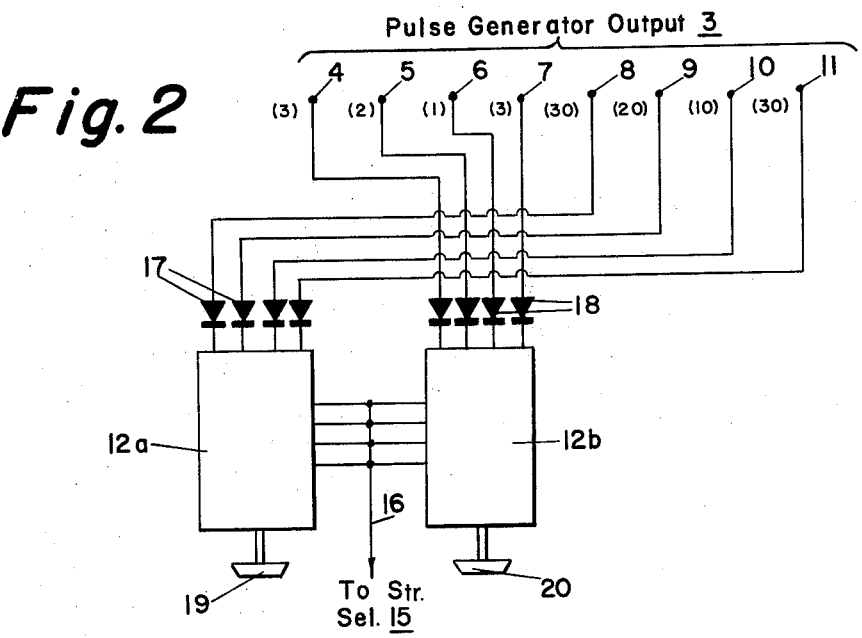
FIGS. 2 and 3 are wiring diagrams of portions of the FIG. 1 system.

Refer now to FIG. 2. During the unit time interval, the number of pulses appearing at the respective output terminals of the pulse generator 1 will be as follows: terminal 4, three pulses; terminal 5, two pulses; terminal 6, one pulse; terminal 7, three pulses; terminal 8, thirty pulses; terminal 9, twenty pulses; terminal 10, ten pulses; terminal 11, thirty pulses.

The rotating magnets previously referred to are driven by a driving motor provided with a suitable manual speed adjustment device. By means of such device, the speed of the driving motor can be set or adjusted by the person operating the system. Thus, the rate of generation of pulsese by pulse generator 1 (or, the actual duration of the unit time interval previously referred to) is determined by the speed of the (magnet) driving motor. As an alternative to the manual speed adjustment of the motor, a voltage control device (adjusted automatically, in a maner to be described hereinafter) is used to feed the driving voltage to the (magnet) driving motor. In this case, also, the rate of generation of pulses is determined by the speed of the driving motor, but now the speed adjustment or control is automatic, rather than manual.

For a somewhat more detailed disclosure of a suitable pulse generator, reference may be had to my aforesaid application.

The group of thirty, twenty, ten, and thirty pulses (appearing at output terminals 8, 9, 10, and 11, respectively, during the aforesaid unit time interval) can be arranged to form a "tens" decade, this group totaling ninety pulses. Any desired number of "tens" of pulses, from one "ten" through nine "tens," can be obtained by an appropriate selection of the terminals 8–11, taken singly or in combination (additively). Thus, ten pulses are obtained by selecting terminal 10 alone; twenty pulses, by selecting terminal 9 alone; thirty pulses, terminal 8 or terminal 11 alone; forty pulses, terminals 8 (or 11) and 10 in combination; fifty pulses, terminals 8 (or 11) and 9 in combination; sixty pulses, terminals 8 and 11 in combination; seventy pulses, terminals 8, 11, and 10 in combination; eighty pulses, terminals 8, 9, and 11 in combination; ninety pulses, terminals 8, 9, 10, and 11 in combination.

The group of three, two, one, and three pulses (appearing at output terminals 4, 5, 6, and 7, respectively, during the aforesaid unit time interval) can be arranged to form a "units" decade, this group totaling nine pulses. The selection of terminals for any number of pulses from one through nine is analogous to that previously described for the "tens" decade, in the preceding paragraph.

As previously described, the pulse generator output 3 actually comprises a set of eight output terminals 4–11, at each of which appears, during the unit time interval, the respective number of pulses indicated in FIG. 2. Now refer again to FIG. 1. Speaking somewhat generally, each of these pulses results from the closure (by one of the switches in generator 1) of a circuit extending from power supply 2 to the respective pulse generator output terminal. Pulses from the pulse generator 1 are fed to a pair of percentage switches 12 which comprise a controller for a second fluid B, and also to an APC (automatic percentage control) unit 13 which will be described in detail hereinafter. The pulse output of the unit 13, which output is denoted generally by numeral 14, is fed to contacts in a stream selector switch 15. The pulse output of switches 12, which output is denoted generally by numeral 16, is also fed to contacts in selector switch 15. By means of the stream selector switch 15, the APC unit 13 may be inserted into the control chain for any selected fluid, as a substitute for the percentage switches normally utilized in such chain. Assume that the selector switch has been operated to insert unit 13 into the control chain for a first fluid A. Therefore, the APC unit 13 comprises in this setup a controller for fluid A. Fluid A is assumed to be the major component of the blended fluid.

Preferably, the pulse generator 1, the percentage switches 12, and the APC unit 13 are all located at a central control location. For purposes of simplicity, in FIG. 1 there is illustrated a fluid proportioning system (blending system) for only two different fluids. However, the concept of this invention is readily applicable to a greater number of different fluids than two. In the latter case, an additional pair of percentage switches, each similar to that denoted by 12 (which will be described hereinafter), would be utilized for each different fluid, each such pair of switches comprising a controller for its respective fluid. All of such additional switches would be fed from the common pulse generator 1, and all of these switches would be located at the same central control location.

Refer again to FIG. 2. The percentage switches 12a and 12b together comprise the pair 12 of percentage switches. Switch 12a is coupled to the "30," "20," "10," and "30" pulse generator output terminals 8, 9, 10, and 11, respectively, a separate diode such as 17 being provided in each individual coupling. Switch 12b is coupled to the "3," "2," "1," and "3" pulse generator output terminals 4, 5, 6, and 7, respectively, a separate diode such as 18 being provided in each of these latter individual couplings. The switches 12a and 12b have a common output connection or lead 16, which extends to the stream selector switch 15.

Switches 12a and 12b are each of a commercially-available type having four decks or wafers, in each of which there is a rotatable contact selectively engageable with one of ten fixed contacts. The rotatable contacts of the four decks of switch 12a are mechanically ganged together and are operated by a common knob 19, while the rotatable contacts of the four decks of switch 12b are mechanically ganged together and are operated by a common knob 20. The percentage switches 12a and 12b (and also any other percentage switch pairs which may be utilized) are wired in such a manner that they function to pass to the switch output lead 16, during each unit time interval, only a selected fraction (selected by the setting of knobs 19 and 20) of the total number of pulses (ninety-nine in total number) generated by generator 1 during this same time interval. These switches 12a and 12b are manually adjustable (by knobs 19 and 20) to pass on any whole number (from one through ninety-nine) of these pulses. Taking switch 12a as an example, the knob 19 is manually operable to positions representing the "tens" digits, ten through ninety. When knob 19 is turned to a position representing "10," a circuit is completed (within switch 12a) from pulse generator output terminal 10 to switch output lead 16. In the "20" position of knob 19, a circuit is completed from terminal 9 to lead 16; for "30," a circuit is completed from terminal 8 or terminal 11 to lead 16; for "40," circuits are completed from both terminals 8 (or 11) and 10 to lead 16; for "50," circuits are completed from both terminals 8 (or 11) and 9 to lead 16; for "60," circuits are completed from both terminals 8 and 11 to lead 16; for "70," circuits are completed from terminals 8, 11, and 10 to lead 16; in the "80," position of knob 19, circuits are completed from terminals 8, 11, and 9 to lead 16; for "90," circuits are completed from terminals 8, 9, 10, and 11 to lead 16. By manual operation of knob 19, which rotates the rotatable contacts of switch 12a, any selected number of tens of pulses (from ten up to and including ninety, and including zero) may be passed on from pulse generator 1 to switch output lead 16, during each unit time interval.

Similar principles are utilized for the wiring of switch 12b, for the "units" pulses, one through nine. The knob 20 is manually operable to positions representing the "units" digits, one through nine. By manual operation of knob 20, which rotates the rotatable contacts of switch 12b, any selected unit number of pulses (from one up to and including nine, and including zero) may be passed on from pulse generator 1 to switch output lead 16, during each unit time interval.

It should be seen that the pair of switches 12a and 12b are related to each other in decade fashion, and that by proper manual operation (manipulation of knobs 19 and 20), any whole number (from one through ninety-nine) of pulses may be caused to appear on switch output lead 16, during each unit or basic time interval.

For a somewhat more detailed disclosure of the percentage switches, reference may be had to my aforesaid application.

Refer again to FIG. 1. As previously stated, the pair of percentage switches 12 comprises a controller for a fluid B, as switched by stream selector 15. The pulses appearing on switch output lead 16 (as determined by the setting of switches 12a and 12b) are fed through stream selector 15 to the energizing winding of a valve operator motor relay (not shown), for example of the so-called mercury-wetted type, which operates once for each such pulse to complete (in pulse fashion) an energizing circuit for a stepping motor 21 in the valve operator B. It will be recalled that the pulses used to operate the aforesaid motor relay are derived from power source 2, by way of master pulse generator 1 and the percentage switch pair 12. By means of the aforesaid motor relay, energizing pulses are provided (under the selective control of the station controller or percentage switch pair 12) for the motor 21. Motor 21 is of the stepping type, turning one revolution for each one hundred electrical pulses supplied thereto.

The motor 21 is connected through suitable gearing to one input side of a subtractive-type differential 22 in the aforesaid valve operator. The differential 22 has two mechanical inputs and one output shaft. The output shaft 23 of the differential (which shaft is illustrated schematically in FIG. 1) is connected through suitable gearing to the operating shaft (stem) of a valve 24 which requires rotary motion for its operation and which is inserted in the flow conduit 24 for fluid B. Fluid B flows through conduit 25 in the direction indicated by the arrows in FIG. 1. The motor 21, acting through differential 22, tends to open valve 24, by way of shaft 23. Valve 24 serves as a flow controlling device for fluid B.

In the conduit 25, but downstream from valve 24, is a flowmeter 26 which senses the flow of fluid through conduit 25. Flowmeter 26 may be of the positive displacement type, having as a part of its read-out mechanism a set of contacts electrically connected to power source 2 and operated (by the flowmeter moving element) at a rate proportional to the fluid flow rate through the meter 26 and conduit 25. Alternatively, it may comprise a so-called "metering pump" having a set of contacts similarly electrically connected and operated; in this case, the "metering pump" (which has a readily-adjustable pumping rate) performs the functions of both a flowmeter and a valve, so that the valve 24 as such could be eliminated, the differential output 23 then controlling the "metering pump" to control the flow of fluid in conduit 25. Alternatively, a turbine-type flowmeter, such as that disclosed in my copending application Serial No. 121,239, filed June 30, 1961, now Patent No. 3,136,159, could be used at 26. Such a flowmeter generates pulses, independently of any external power source, at a rate proportional to the fluid flow being metered; these pulses can be readily amplified.

In any event, and no matter what type of flowmeter is used at 26, pulses are produced by the metering device (flow sensing device) at a rate proportional to the fluid flow rate through the metering device (and through the conduit 25). These pulses appear at the output 27 of the flowmeter and are fed to the energizing winding of a valve operator motor relay (not shown), for example of the so-called mercury-wetted type, which operates once for each such pulse to complete (in pulse fashion) an energizing circuit for a second stepping motor 28 in the valve operator B. By means of the aforesaid motor relay, energizing pulses are provided (under the control of the flowmeter 26) for the motor 28. Motor 28, like motor 21, is of the stepping type, turning one revolution for each one hundred electrical pulses supplied thereto.

The motor 28 is connected through suitable gearing to the second input side of differential 22 in valve operator B. The motor 28, acting through differential 22, tends to close the valve 24.

The valve operator B (comprising elements 21, 22, and 28, plus gearing, etc.) will not be described herein in detail, since it forms no part of the present invention. This valve operator is disclosed and claimed in my copending application Serial No. 133,075, filed August 22, 1961.

The differential 22, as previously stated, subtracts the rotations of the two motors 21 and 28. If these motors are rotating at the same speed, there will be no rotation of output shaft 23, and consequently no movement of valve 24. If, however, one motor rotates faster than the other, then shaft 23 will rotate and the valve 24 will open or close, depending on which motor is rotating the faster. Specifically, if motor 21 rotates faster than motor 28, shaft 23 will rotate in such a direction as to open valve 24; if motor 28 rotates faster than motor 21, shaft 23 will rotate in such a direction as to close valve 24.

If changes in fluid pressure, etc., tend to change the flow rate through conduit 25 and meter 26, the change in the pulse rate from this meter will result in adjustment of the valve 24 to a new position. The result is that the flow rate of fluid B will be exactly controlled by the pulse generator 1, acting through percentage switch 12 and valve operator B.

Summarizing the action just described, the valve 24 is brought to (and, during system operation, is maintained at) a position where the fluid flow rate through flowmeter 26 (and through the valve 24 and conduit 25) is such that the pulse rate (in pulses per second) from the meter 26 matches exactly the pulse rate from the percentage switches 12. At that time, the two motors 21 and 28 will be running at the same speed, and there will be no output from the subtracting differential 22 to change the position of valve 24. At this position, then, the flow rate of the fluid B stream will be exactly proportional to the pulse rate of pulse generator 1 multiplied by the setting of the percentage switches 12.

For a somewhat more detailed explanation of the action of the flow control system previously described (for fluid B), reference may be had to my copending application Serial No. 180,211.

If a second, or any reasonable number, of flow control systems similar to the one previously described is connected to the same pulse generator 1, and if the various fluids are mixed together at a point downstream from the flowmeters in the respective conduits, a proportioning system (and specifically, a blending system) is provided. A blending system of this type, for two fluids, will now be described.

An APC unit 13, to which pulses from the pulse generator 1 are fed, is functionally similar to percentage switches 12, in that this APC unit operates to pass to its output 14, during each unit or basic time interval, only a selected fraction of the total number of pulses generated by generator 1 during this same interval. However, the construction of the APC unit is considerably different from that of the percentage switches 12. The APC unit 13 is settable or adjustable manually, by means of knobs, but is also adjusted or reset automatically (by means of a driving motor), as required by variations from a predetermined "norm" in a measured physical characteristic of the blended fluid, to produce an effect which counteracts such variations. This will be described in more detail hereinafter.

Figure 3:
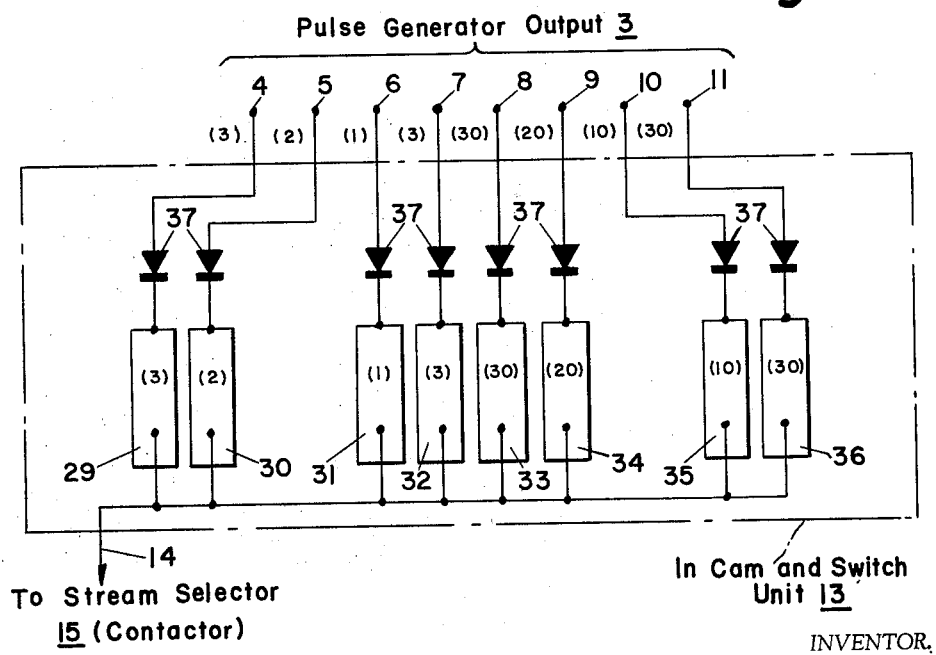

Referring now to FIG. 3, the APC unit 13 includes a set of eight cam-operated single-pole, single-throw microswitches or snap-action switches 29–36. One terminal of each switch is wired, each by way of a separate diode such as 37, to a respective one of the pulse generator output terminals 4–11. The other terminals of all the switches are multipled or commoned together to an output lead 14. Switch 29 is coupled through a diode 37 to pulse generator terminal 4; thus, when switch 29 is closed, three pulses per unit time interval are furnished to lead 14. Switch 30 is coupled through a diode 37 to pulse generator terminal 5; when this switch is closed, two pulses per unit time interval are furnished to lead 14. Switch 31 is coupled to pulse generator terminal 6; when this switch is closed, one pulse per unit time interval is furnished to lead 14. Switch 32 is coupled to pulse generator terminal 7; when this switch is closed, three pulses per unit time interval are furnished to lead 14. Switch 33 is coupled to pulse generator terminal 8; when this switch is closed, thirty pulses per unit time interval are furnished to lead 14.

Switch 34 is coupled to pulse generator terminal 9; when this switch is closed, twenty pulses per unit time interval are furnished to lead 14. Switch 35 is coupled to pulse general terminal 10; when this switch is closed, ten pulses per unit time interval are furnished to lead 14. Finally, switch 36 is coupled to pulse generator terminal 11; when this switch is closed, thirty pulses per unit time interval are furnished to lead 14.

The four switches 29–32 constitute a "units" group, and by appropriate closure of these switches, singly or in combination (so as to add), any "units" number of pulses, from one through nine, may be caused to appear on lead 14 during each unit time interval. Thus, for one pulse, switch 31 would be closed; for two pulses, switch 30 would be closed; for three pulses, switch 29 would be closed; for four pulses, switches 29 and 31 would be closed; for five pulses, switches 29 and 30 would be closed; for six pulses, switches 29 and 32 would be closed; for seven pulses, switches 29, 32, and 31 would be closed; for eight pulses, switches 29, 32, and 30 would be closed; and for nine pulses, switches 29, 30, 31, and 32 would all be closed. Switches 29, 30, 31, and 32 are operated by cams on a first rotatable disc, as will be described hereinafter.

The four switches 33–36 constitute a "tens" group, and by appropriate closure of these switches, singly or in combination (so as to add), any "tens" number of pulses, from ten through ninety, may be caused to appear on lead 14 during each unit time interval. The coding or scheme for closure of these latter switches corresponds to that of the group 29–32, so will not be repeated here. Switches 33, 34, 35, and 36 are operated by cams on a second rotatable disc.

By way of example, for the "tens" switch group 33–36 and the "units" switch group 29–32 taken together, for a setting of "65" (in which case sixty-five pulses would appear on lead 14 during each unit time interval), switches 33 and 36 of the "tens" group would be closed (to give sixty pulses), and switches 29 and 30 of the "units" group would be closed (to give five pulses).

Refer again to FIG. 1. Assume that the stream selector switch 15 has been operated to insert the APC unit 13 into the control chain for fluid A. The pulses appearing on the output lead 14 of unit 13 (as determined by the pattern of operation of switches 29–36) are fed through stream selector 15 to the energizing winding of a valve operator motor relay (not shown), which latter may be like the similarly-designated relay referred to previously in connection with percentage switches 12 and switch output lead 16. By means of the relay coupled to output lead 14, an energizing circuit (operating in pulse fashion, one motor energizing pulse for each pulse on lead 14) is completed for a stepping motor 38 in the valve operator A. The pulses used to operate the motor relay for fluid A are derived from power source 2, by way of master pulse generator 1 and APC unit 13. By means of this last-mentioned motor relay, energizing pulses are provided (under the selective control of the station controller or unit 13) for the motor 38. Motor 38 is of the stepping type, and is preferably exactly similar in construction to motor 21, previously described.

The motor 38 is connected through a suitable gearing to one side of a subtractive-type differential 39 in valve operator A. Differential 39 has two mechanical inputs and one output shaft. The output shaft 40 of differential 39 (which shaft is illustrated schematically in FIG. 1) is connected through suitable gearing to the operating shaft (stem) of a valve 41 which requires rotary motion for its operation and which is inserted in the flow conduit 42 for fluid A. Fluid A flows through the conduit 42 in the direction indicated by the arrow in FIG. 1. The motor 38, acting through differential 39, tends to open valve 41, by way of shaft 40. Valve 41 serves as a flow controlling device for fluid A.

In conduits 42, downstream from valve 41, is a flowmeter 43 which senses the flow of fluid through this conduit. Flowmeter 43 may be of any of the types previously mentioned in connection with meter 26. Flowmeter 43 senses the flow through conduit 42 and (just as does meter 26 for its conduit 25) produces pulses at a rate proportional to the fluid flow rate through conduit 42. Preferably, the meters 26 and 43 (and any other flowmeters which may be used in a proportioning or blending system) all produce the same number of pulses per gallon of fluid. The pulses appearing at the output 44 of flowmeter 43 are fed to the energizing winding of a valve operator motor relay (not shown), which latter may be like the similarly-designated relay referred to previously in connection with flowmeter 26 and flowmeter output 27. By means of the relay coupled to output 44, an energizing circuit (operating in pulse fashion, one motor energizing pulse for each pulse at output 44) is completed for a stepping motor 45 in valve operator A. By means of this last-mentioned relay, energizing pulses are provided (under the control of the flowmeter 43) for the motor 45. Motor 45 is of the stepping type, and is preferably exactly similar in construction to motor 28, previously described.

The motor 45 is connected through suitable gearing to the second input side of differential 39 in valve operator A. The motor 45, acting through differential 39, tends to close the valve 41.

The valve operator A is preferably exactly similar in construction to the valve operator B, previously described, and operates quite similarly thereto. The flow rate of fluid A will be exactly controlled by the pulse generator 1, acting through the APC unit 13 and valve operator A. The valve 41 will be brought to a position where the flow rate through meter 43 is such that the pulse rate (in pulses per second) from this meter matches exactly the pulse rate from the APC unit 13. At that time the motors 38 and 45 will be running at the same speed, and there will be no output from the subtracting differential 39 to change the position of valve 41. At this position, then, the flow rate of fluid A will be exactly proportional to the pulse rate of pulse generator 1 multiplied by the setting of the APC unit 13.

Both the unit 13 and the percentage switch pair 12 receive pulses from the same single master pulse generator 1. Since the flow rate of fluid stream B is maintained exactly proportional to the pulse rate of pulse generator 1 multiplied by the setting of percentage switch pair 12, and since the flow rate of fluid stream A is maintained exactly proportional to the pulse rate of this same pulse generator multiplied by the setting of APC unit 13, an extremely accurate and convenient proportioning (blending) system results.

As previously described, the APC unit 13 is settable or adjustable manually. Such an APC unit, together with the automatic resetting or control arrangement to be described, can be used on every stream of fluid which has a manually settable device for pulse selection. Thus, it can be used on the controlled fluid stream A, which stream has a control valve therein.

Alternatively, and as disclosed in my application Serial No. 180,211, the fluid A stream may be "wild" or uncontrolled, and the output of differential 39 may be used to control the pulse generation rate of pulse generator 1. In this case, of course, the valve 41 would not be present, and the motor which drives pulse generator 1 would be provided with a mechanically-actuatable speed control device which is attached to and driven by the output shaft 40 of differential 39. In this case, the pulse generation rate of pulse generator 1 is under the control of, and is responsive to, the output of differential 39. In this case, the control chain for fluid A includes the APC unit 13, just as before.

The conduits 42 and 25, carrying fluids A and B, respectively, come together at a junction point or T 46, which marks one end of a pipe or conduit 47 carrying the blended fluid (blend of fluids A and B).

According to this invention, a physical characteristic of the final blended fluid (blended product) is measured, and in response to unpredictable or fortuitous variations in such characteristic from a predetermined (desired) value, the proportion of one fluid component (to wit, the major component of the blend) is reset automatically, to return the said physical characteristic of the blended fluid to its desired or proper value. The manner in which this automatic control is effected will now be described.

Among the physical characteristics of the final blended fluid which can be measured are: color, viscosity, specific gravity, initial boiling point, and 50% boiling point. Purely by way of example, it will be assumed herein that viscosity is being measured, and the description will proceed on that basis.

A measuring instrument 48 (e.g., a viscometer) is coupled into the blended-fluid line 47, to sense (i.e., measure) the selected physical characteristic of the blended fluid. A transducer 49 (see FIG. 4) is coupled to the measuring instrument 48, to convert the value of the measured physical characteristic to an electrical signal (e.g., a voltage). This last-mentioned signal voltage is applied to a motor control circuit 50 (shown in detail in FIG. 4, and to be described hereinafter) which in turn controls a pulse or stepping motor 51 (see FIG. 4) in the APC unit 13. Speaking generally, whenever the physical characteristic of the blended fluid, as measured by the instrument 48, varies from the specified or predetermined value, a signal voltage is caused to appear at the output of transducer 49, the relative sense of this voltage depending upon the direction of variation of the characteristic from the specified value. When this signal voltage is sufficient, the motor control circuit 50 operates to automatically step the APC unit 13 in one direction or the other, one unit or point at a time, the direction of stepping depending upon the sense of the signal voltage. The stepping or resetting of APC unit 13 changes the proportion of the major component fluid A in the blended fluid, and this stepping or resetting is continued (the successive steps, if necessary, taking place at spaced time intervals) until the physical characteristic of the blended fluid (product) returns to its desired or proper or specified or predetermined value.

The electrical circuitry employed to produce the automatic stepping of the APC unit will first be described, following which the mechanical construction of this unit (whereby the switches of FIG. 3 are properly operated, etc.) will be described.

Refer now to FIG. 4. The measuring instrument transducer 49 is coupled to a direct current source, and operates or functions to produce across its output leads 52 a voltage dependent on, and proportional to, the blended fluid physical characteristic (e.g., viscosity) being measured. This produced voltage is of one relative sense or the other (e.g., of one polarity or the opposite), with respect to zero, depending upon whether the physical characteristic is greater or less than a predetermined value, and the value of the voltage produced across leads 52 is proportional to the amount of variation of the physical characteristic, from its assigned or predetermined value. The voltage produced across output leads 52 is coupled across the ends of the operating winding 53 of a zero-center microammeter 54 having a range of fifty microamperes on each side of the center, and located in the control circuit 50. Such instruments are widely used in the electrical power field and are generally termed "marginal relays" or "meter relays," although they may be termed "control meters" or "sensitive relays." The indicating needle 55 of instrument 54 is normally in the middle or zero position, and this instrument has contacts 56 and 57, one on each side of the needle. When the needle moves to either side and touches one of these contacts, an electrical circuit is completed from the needle to the contact. Thus, when the voltage produced across output leads 52 is sufficiently high and of one sense or polarity, a circuit is completed between needle 55 and contact 56; when this voltage is sufficient and of the opposite sense or polarity, a circuit is completed between needle 55 and contact 57.

The needle 55 is connected to one terminal of a direct current source. From contact 57, a circuit extends in series through the respective windings 58 and 59 of a pair of relays 60 and 61, to the other terminal of the direct current source. Thus, when needle 55 engages contact 57, relays 60 and 61 are both energized. From contact 57, a circuit extends in series through the respective windings 62 and 63 of a pair of relays 64 and 65, to the terminal of the direct current source opposite to that to which needle 55 is connected. When needle 55 engages contact 57, relays 64 and 65 are both energized.

The pulse or stepping motor 51 is of a commercially-available type having two windings one of which when energized causes the motor to step in one direction and the other of which when energized causes the motor to step in the opposite direction. Motor 51 has detent means therein, and is so constructed and arranged that each pulse supplied to one of the motor windings causes the motor output shaft 66 to rotate through an angle of 36° in one direction, while each pulse supplied to the other motor winding causes shaft 66 to rotate through an angle of 36° in the opposite direction.

The relay 60 has a pair of normally-open contacts 67 which when closed complete a circuit from the positive terminal of a suitable direct current power source through a resistor 68 to one end of one winding of the pulse motor 51. The relay 64 has a pair of normally-open contacts 69 which when closed complete a circuit from the positive source terminal through resistor 68 to one end of the other winding of the motor 51. The other or lower ends of both motor windings are connected together and to the cam-operated single-pole, single-throw switch 70 which when closed connects the lower ends of both motor windings to the negative terminal of the direct current source. If contacts 67 are closed, a voltage pulse will be supplied from the direct current power source to one winding of motor 51 each time that switch 70 closes, each of these pulses causing a stepping of motor shaft 66 through an angle of 36° in a certain direction (say clockwise). If contacts 69 are closed, a voltage pulse will be supplied from the direct current power source to the other winding of motor 51 each time that switch 70 closes, each of these pulses causing a stepping of motor shaft 66 through an angle of 36° in the opposite or counterclockwise direction.

The timer motor 71 is a synchronous motor which drives, through a gear reduction arrangement and coupling indicating schematically at 72, a cam disc 73 in which there is a narrow notch 74. Disc 73 is driven by this motor at a speed of one revolution in two minutes.

The relay 61 has a pair of normally-open contacts 75 which when closed complete an energization circuit between a 60-c.p.s. alternating current power source and motor 71. The relay 65 has a pair of normally-open contacts 76 which when closed complete a parallel energization circuit between the alternating current source and motor 71. The contacts of a cam-operated single-pole, single-throw switch 77, when closed, complete a parallel energization circuit between the alternating current source and motor 71.

Motor 71 drives the cam disc 73 in the direction indicated by the arrow A. The actuating lever of the microswitch or snap-action switch 70 rides on cam 73. This switch is held open by the disc throughout most of the 360° rotation of such disc, but when the actuating lever of switch 70 falls into notch 74, this switch closes. The actuating lever of the microswitch or snap-action switch 77 also rides on cam 73. Switch 77 is opened only when its actuating lever falls into notch 74 (in the disc position illustrated); this latter switch is held closed by the disc through most of the 360° rotation of such disc.

If the measured physical characteristic (e.g., viscosity) of the blended fluid stream departs from its proper value by a sufficient amount, the sensitive relay 54 is operated. Assume that this relay is operated in such a direction that needle 55 engages contact 56. This energizes relays 64 and 65, pulling up (i.e., closing) their respective contacts 69 and 76. The closure of contacts 69 sets up a circuit from the direct current source to one winding of pulse motor 51, but an energization circuit is not completed at this time since switch 70 is still held open by cam disc 73. The closure of contacts 76 completes a circuit from the alternating current source to timer motor 71, and this motor begins to rotate disc 73.

As disc 73 rotates in the direction A, the actuating lever of switch 77 rides up out of notch 74, closing this switch. This establishes a parallel energization circuit for timer motor 71, and ensures that this motor will remain energized at least long enough (two minutes) to drive disc 73 through one complete revolution, even though before the end of this time relay 65 is deenergized to open its contacts 76.

As disc 73 continues to rotate, notch 74 comes adjacent the actuating lever of switch 70, resulting in a closing of this switch as the switch actuating roller drops into the notch, followed by an opening thereof as the actuating roller rides up out of the notch. When switch 70 closes in this manner, a voltage pulse is supplied from the direct current power source to one winding of pulse motor 51 (since contacts 69 are closed), the particular winding of motor 51 which is energized being the one to which the circuit is completed by closed contacts 69. This pulse results in a stepping of motor shaft 66 through an angle of 36° in say the counterclockwise direction. A complete pulse is supplied to the pulse or stepping motor 51, due to the closing of switch 70 following by the opening thereof.

The stepping of the motor shaft 66 through an angle of 36° causes the APC unit 13 (see FIG. 1) to step or reset one unit or point in a predetermined direction (either up or down). The direction in which this APC unit is stepped is such that the resulting change in the proportions of fluid A (which fluid is controlled by unit 13, as previously described) in the blend is in the appropriate direction to return the measured physical characteristic (say viscosity) of the blended fluid toward its proper, desired, or specified value.

The disc 73 requires two minutes for a complete revolution, while the switch 70 is closed (thereby to pulse motor 51 and reset the unit 13 by one point, to change the proportions of fluid A in the blended product) rather early in the rotation of this disc. If during the first two-minute revolution of the disc 73 (and of course after operation of switch 70), the measured physical characteristic of the blended fluid returns to its proper value, needle 55 becomes disengaged from contact 56, deenergizing relays 64 and 65 and opening contacts 69 and 76. Disc 73 continues to rotate, however (motor 71 being maintained energized through closed switch 77), until the actuating lever of switch 77 falls into notch 74, opening this switch. This deenergizes motor 71 and stops the rotation of disc 73, since contacts 76 are open at this time.

If, on the other hand, the change of one point in the proportions of fluid A (resulting from the one pulsing of motor 51) is insufficient to return the characteristic of the blended product to its proper value, sensitive relay 54 remains operated for the entire two minutes, which means that relays 64 and 65 remain energized and contacts 69 and 76 remain closed. In this case, when notch 74 comes around to switch 77, this switch is opened as before, but now motor 71 is maintained energized through closed contacts 76, and the cam disc 73 continues to rotate. As it does so, the cycle is repeated. Switch 77 is closed to lock in motor 71 for another complete revolution of disc 73, and switch 70 is operated (closed and opened) to again pulse the motor 51, stepping the motor shaft 66 another 36° in the same direction as before, say counterclockwise. This steps APC unit 13 one more point in the same direction as before, changing the proportions of fluid A in the blend by one more point in the same direction.

The foregoing may repeat for a third revolution of disc 73, or this disc may come to rest at the end of the second revolution. At any rate, the result is that the proportions of fluid A in the blend are reset automatically, to return the characteristic of the blended fluid to its proper or correct value.

Now assume a second case. If the measured physical characteristic of the blended fluid stream departs from its original, correct value in a direction opposite to that of the first case, needle 55 engages contact 57, energizing relays 70 and 61 and closing contacts 67 and 75. The closure of contacts 67 now sets up a circuit from the direct current source to the other (i.e., the left-hand in FIG. 4) winding of pulse motor 51, to step this motor in the opposite direction (so that motor shaft 66 is stepped say clockwise) when switch 70 closes, but otherwise the operation is the same as before. Closure of contacts 75 completes an energization circuit for the timer motor 71, and this motor rotates disc 73 in the same direction as before. In this second case, of course (since motor shaft 66 is stepped in a direction opposite to that in the first case), APC unit 13 is stepped or reset one unit or point in a direction opposite to that of the first case. This causes the proportions of fluid A in the blend to change in a direction opposite to that in the first case. Just as in the first case, at least one revolution of disc 73 occurs, although more than one revolution may take place if necessary.

Figure 6:
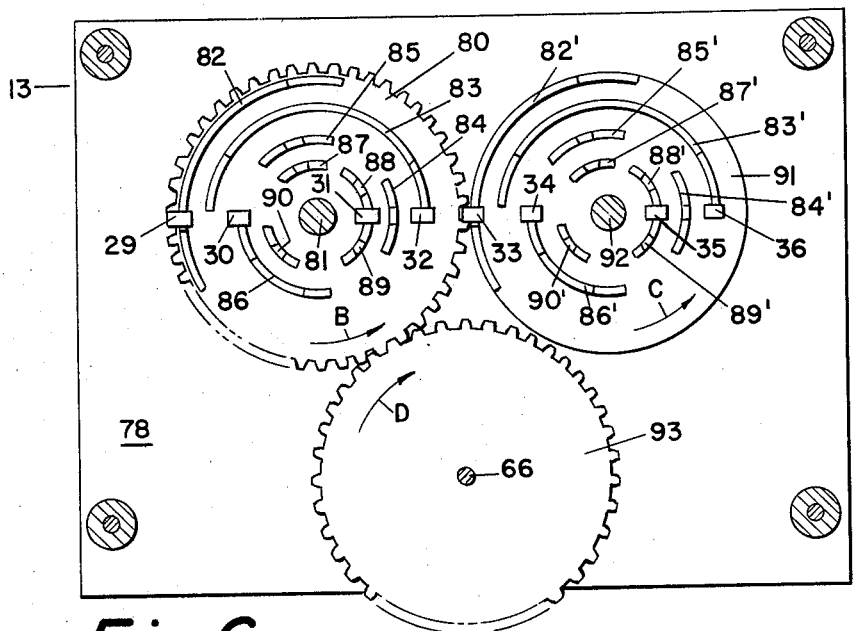
FIG. 6 is a rear view of the APC unit, taken along line 6—6 of FIG. 5.

The construction of the APC unit 13 will now be described. Refer first to FIG. 5. Most of the mechanically-operating components of the unit 13 are mounted within on open framework provided between spaced front and rear plates 78 and 79, respectively. A "units" cam disc 80 is pinned to a shaft 81 which is journaled for rotation in the plates 78 and 79. Shaft 81 extends outwardly (forwardly) beyond the front plate 78 and is provided with a "flat" at its outer end, to which a knob (not shown) is fastened, to enable manual rotation of this shaft and of disc 80. The knob just mentioned carries a pointer which cooperates with a scale having indicia to provide a "units" decade. By manual rotation of the knob and of shaft 81, the disc 80 may be set to a position representative of any selected unit digit, from zero to nine. In FIG. 6, which shows the rear side of this disc, it is illustrated in the "zero" position.

Now refer to FIG. 6. The rear face of disc 80 carries a set of four surface cams which respectively operate the four switches 29, 30, 31, and 32 previously referred to in connection with FIG. 3. These switches are mounted rearwardly of plate 79 (see FIG. 5), and their actuating rollers extend forwardly from the switch bodies a distance sufficient to be actuated by the cams of disc 80. To facilitate the description, the actuating rollers of these switches have been added to FIG. 6, although they should not, strictly speaking, be shown in this view. Also, for purposes of simplicity, the actuating rollers or actuating levers of the microswitches or snap-action switches 29–32 have respectively been denoted by the same reference numerals as the switches themselves. The four cams, each of which operates a respective one of the switches 29–32, are arranged in the form of concentric circles on the rear face of disc 80, and the four switch rollers are located along a diameter of disc 80, each one at a radial position corresponding to a respective one of the cam circles. Thus, switch roller 29 is the radially outermost roller, and this roller (and also switch 29) is operated by a single cam 82 of rather substantial arcuate length. The contacts of switch 29 are normally closed, and these contacts are opened by cam 82. Proceeding radially inwardly, the next switch roller is roller 32, which is positioned on the opposite side of shaft 81 from roller 29. Roller 32 (and also switch 32) is operated by a single cam 83 of rather substantial arcuate length. The contacts of switch 32 are normally open, and these contacts are closed by cam 83. The next switch roller, radially inwardly, is roller 30, which is positioned on the same side of shaft 81 as roller 29. Roller 30 (and also switch 30) is operated by three spaced cams, two cams 84 and 85 of minimum length and one cam 86 of somewhat greater length. The contacts of switch 30 are normally open, and these contacts are closed by cams 84, 85, and 86. The innermost switch roller is roller 31, which is positioned on the same side of shaft 81 as roller 32. Roller 31 (and also switch 31) is operated by four spaced cams 87, 88, 89, and 90, each of minimum length. The contacts of switch 31 are normally open, and these contacts are closed by cams 87, 88, 89, and 90.

As stated previously, FIG. 6 shows disc 80 in the "zero" position. It will be appreciated, from what has gone before, that disc 80 can be rotated manually, while switches 29–32 are stationary. Disc 80 is rotated in the "up" direction indicated by arrow B, in steps of 36°, for the digits one through nine. In the "zero" position illustrated, switches 30, 31, and 32 are not engaged by cams, so they are in their "normal" or open positions, while switch 29 is "operated" or opened by cam 82. Thus, all switches are open for "zero" and no pulses from the "units" decade reach lead 14 (see FIG. 3).

It will be recalled, from FIG. 3, that switch 29 receives three pulses from the pulse generator during each unit time interval, switch 30 receives two pulses, switch 31 one pulse, and switch 32 three pulses. When disc 80 rotates through 36° in direction B for the digit "one," cam 89 closes switch 31, while cam 82 maintains switch 29 open; this gives one pulse per unit time interval at the output 14 of the APC unit 13. When disc 80 rotates through another 36° in direction B, cam 85 closes switch 30, while cam 82 maintains switch 29 open; this gives two pulses per unit time interval at output 14, for digit "two." When disc 80 rotates through another 36° in direction B, switch 29 is in its normal or closed position because cam 82 no longer holds it open; this gives three pulses per unit time interval at output 14, for digit "three." When disc 80 rotates through another 36° in direction B, switch 29 is in its normal or closed position and cam 90 closes switch 31; this gives four pulses per unit time interval at output 14, for digit "four." When disc 80 rotates through another 36° in direction B, switch 29 is in its normal or closed position and cam 84 closes switch 30; this gives five pulses per unit time interval at output 14, for digit "five." When disc 80 rotates through another 36° in direction B, switch 29 is still in its normal or closed position and cam 83 closes switch 32; this gives six pulses per unit time interval at output 14, for digit "six." When disc 80 rotates through another 36° in direction B, switch 29 is still in its normal or closed position, cam 83 closes switch 32, and cam 87 closes switch 31; this gives seven pulses per unit time interval at output 14, for digit "seven." When disc 80 rotates through another 36° in direction B, switch 29 is still in its normal or closed position, cam 83 closes switch 32, and cam 86 closes switch 30; this gives eight pulses per unit time interval at output 14, for digit "eight." When disc 80 rotates through another 36° in direction B, switch 29 is still in its normal or closed position, cam 83 closes switch 32, cam 88 closes switch 31, and cam 86 closes switch 30; this gives nine pulses per unit time interval at output 14, for digit "nine." When disc 80 rotates through another 36° in direction B, it reaches the "zero" position illustrated in FIG. 6.

A "tens" cam disc 91 is pinned to a shaft 92 which is journaled for rotation in plates 78 and 79. Shaft 92 extends outwardly (forwardly) beyond the front plate 78 and is provided with a "flat" at its outer end, to which a knob (not shown) is fastened, to enable manual rotation of this shaft and of disc 91. The knob just mentioned carries a pointer which cooperates with a scale having indicia to provide a "tens" decade. By manual rotation of the knob and of shaft 92, the disc 91 may be set to a position representative of any selected "ten," from zero through ninety. FIG. 6 illustrates the "zero" position of disc 91.

Referring to FIG. 6, the rear face of disc 91 carries a set of four surface cams which respectively operate the four switches 33, 34, 35, and 36 previously referred to in connection with FIG. 3. These switches are mounted similarly to switches 29–32 previously described, and their actuating rollers are actuated by the cams of disc 91. The cams on disc 91 are exactly similar to those on cam disc 80, previously described in detail. Roller 33 is the radially outermost switch roller, and switch 33 is operated by a single cam 82' similar to cam 82. The contacts of switch 33 are normally closed, and these contacts are opened by cam 82'. The next inward switch roller is roller 36, and this roller and its switch are operated by a single cam 83' similar to cam 83. The contacts of switch 36 are normally open, and these contacts are closed by cam 83'. The next inward switch roller is roller 34, and this roller and its switch are operated by three spaced cams 84', 85', and 86' similar respectively to cams 84, 85, and 86. The contacts of switch 34 are normally open, and these contacts are closed by cams 84', 85' and 86'. The innermost switch roller is roller 35, and this roller and its switch are operated by four spaced cams 87', 88', 89', and 90', similar respectively to cams 87, 88', 89' and 90. The contacts of switch 35 are normally open, and these contacts are closed by cams 87', 88', 89', and 90'.

In FIG. 6, disc 91 is illustrated in the "zero" position. Disc 91 is rotatable manually, in the "up" direction indicated by arrow C, in steps of 36°, for the "tens," ten through ninety. The cam operation here, for each step, is exactly analogous to that previously described for disc 80 and switches 29–32, so the description will not be repeated here. Suffice it to say that switch 33 is exactly analogous to switch 29, and the former is operated by its cam 82' in a manner similar to cam 82 and switch 29. Switch 36 is exactly analogous to switch 32, and the former is operated by its cam 83' in a manner similar to cam 83 and switch 32. Switch 34 is exactly analogous to switch 30, and the former is operated by its cam 84', 85', and 86' in a manner similar to cams 84, 85, and 86 and switch 30. Switch 35 is exactly analogous to switch 31, and the former is operated by its cams 87', 88', 89', and 90' in a manner similar to cams 87, 88, 89, and 90 and switch 33 receives thirty pulses from the pulse generator during each unit time interval, switch 34 receives twenty pulses, switch 35 ten pulses, and switch 36 thirty pulses. The switch closure coding for switches 33–36 has been explained previously, in connection with FIG. 3, while the cam operation of these switches is exactly analogous to that of disc 80 and its switches 29–32.

In addition to the manual rotation of cam disc 80, this disc (and shaft 81) is rotatable stepwise in an automatic manner, by pulse or stepping motor 51, which latter is automatically energized by pulses as previously described in connection with FIG. 4. The automatic or motor-driven rotation of disc 80 is effected through a direct gear drive. Spur gear teeth are provided around the periphery of disc 80 (see FIG. 6). Pulse or stepping motor 51 is mounted on the rear side of disc 79, and the output shaft 66 of this motor extends forwardly, through a suitable hole in plate 79. A spur gear wheel 93 is pinned to the motor output shaft 66, and the teeth on wheel 93 mesh with those on disc 80 and effect a direct gear coupling between motor shaft 66 and disc 80. Thus, whenever shaft 81 and disc 80 are turned manually by means of the knob on shaft 81, the motor shaft 66 is rotated also. There is a 1:1 gear ratio between shafts 81 and 66. As previously stated, the motor 51 has detent means therein, which detents at 36° steps of shaft 66. Due to the geared coupling between disc 80 and wheel 93, the detent means in the motor provides a detenting action when shaft 81 is manually rotated, ensuring proper indexing of the cam disc 80.

It should be apparent that when motor shaft 66 is stepped as a result of a pulse being applied to pulse or stepping motor 51 in the manner previously described (FIG. 4), cam disc 80, gear-coupled to wheel 93, and shaft 81, will be stepped also. This automatic stepping (or rotation of 36°) of disc 80, by the motor drive, changes the setting of the "units" cam disc 80 by one digit, changing or resetting the proportions of fluid A (see FIG. 1) in the blend by one unit. The actual setting of the "units" disc 80 will be indicated at all times by the pointer knob (attached to shaft 81) and the scale associated therewith.

To establish the proper relationship between the "tens" switch group or decade 33–36 and the "units" switch group or decade 29–32, it is necessary that the "tens" cam disc 91 be operated or stepped, by the pulse or stepping motor 51, through 1/10 of a revolution each time that the "units" cam disc 80 goes through one complete revolution, this stepping of the "tens" disc taking place as the "units" disc moves from "9" to "0" or from "0" backwards to "9". This intermittent movement of "tens" disc 91 by motor 51 is effected through a Geneva movement, which will now be described.

A plate 94 is firmly secured, as by screws 95, to the front side of gear wheel 93, plate 94 thus being rigidly fastened to pulse motor shaft 66 and rotating therewith. Plate 94 has a single arcuate notch 96 (see FIG. 7) in its periphery, but is otherwise circular in configuration. A pair of cylindrical pins 97, which are rigidly secured to plate 94 one at either side of notch 96, extend forwardly from plate 94.

A driving plate 98 is rotatably mounted on a forwardly-extending central cylindrical boss which is integral with cam disc 91, and is thus rotatably mounted with respect to shaft 92; however, plate 98 is detented to disc 91 in a manner which will be described hereinafter. Plate 98 is formed with ten equiangularly-spaced projections 99 which extend radially outwardly beyond the main body of the plate, in the plane thereof. Plate 98 is positioned slightly in front of plate 94 (see FIG. 5), and the diameter of plate 94 is so related to the diameter of the circle on which the outer ends of projections 99 lie that a pin 97 can engage the side of one of the projections 99, as plate 94 rotates, to rotate plate 98 through the desired angle. Plate 98 carries ten equiangularly-spaced cylindrical pins 100 which extend rearwardly from the plane of the plate and whose centers lie on a circle which coincides approximately with the base circle for the projections 99. The center of each pin 100 lies on a radius which bisects the angle between the radii of the centers of the two adjacent projections 99. Each of the pins 100 is adapted to enter, in its turn, the notch 96. Whenever plate 94 causes rotation of plate 98 in the manner previously described (i.e., when a pin 97 engages one of the projections 99), a pin 100 enters the notch 96 in plate 94, to permit rotation of plate 98. Plate 94 is free to rotate at all times, but pins 100, by engaging the unnotched portion of plate 94, prevent undesired or improper rotation of plate 98, and limit the rotation of this latter plate to 1/10 revolution for each complete revolution of plate 94.

In order to drive the "tens" cam disc 91 from motor 51 by way of the driving plate 98, as well as to allow manual rotation of disc 91 and to effect proper indexing thereof during such manual rotation, a detenting means is utilized. This will now be described.

Driving plate 98 has two integral, diametrically-opposite, bored cylindrical bosses 101 (see FIG. 5) which extend both forwardly and rearwardly from the plane of this plate, parallel to the longitudinal axis thereof. The bosses 101 are located radially inwardly from the pins 100. A rigid ball 102 (made of nylon, for example) is positioned in each respective boss 101 and in front of each ball is a respective coil spring 103 which resiliently urges the balls rearwardly with respect to plate 98. One end of each spring 103 engages the front end of its respective boss 101, and the other end of each spring engages its respective ball 102. Five recesses 104, which are spaced 36° apart along an arc, are formed in the front face of cam disc 91, these recesses being so positioned radially and of such dimensions that the balls 102 can enter therein. In this connection, it is pointed out that plate 98 is located forwardly of disc 91, both being centered on the same shaft 92.

The ball-and-recess arrangement 102, 104 described provides a way of coupling together plate 98 and cam disc 91. For manual setting of cam disc 91, manual rotation of shaft 92 (as by means of a knob) will turn the disc 91 directly, since the latter is pinned to shaft 92. During such manual rotation, plate 98 is held locked in position by the action of pins 100, as previously described. However, during this manual rotation the ball 102 can be pushed upwardly, against its spring, as the recess 104 in which it happens to then be positioned is rotated out of alignment therewith, and another recess 104 is brought into alignment with the ball. The ball can then spring rearwardly into this other recess, to provide a proper indexing and detenting action for the cam disc 91, when the latter is rotated manually. The effect, during this manual setting, is to move the ball 102 out of one recess and into another, although it will be appreciated that the ball itself does not actually move at this time.

Only five recesses 104 are needed to provide ten index positions (for zero, 10, 20, 30, 40, 50, 60, 70, 80, and 90, respectively), since two diametrically-opposite balls 102 are utilized.

For automatic (or motor-driven) resetting of cam disc 91, the pulse motor 51 drives the plate 98 intermittently, through the Geneva movement 97, 99, etc. previously described. When plate 98 rotates, the ball 102 engages the side of the recess 104 in which it is then positioned, and thus in effect locks the plate 98 and the cam disc 91 together. Cam disc 91 and shaft 92 are thus made to rotate along with plate 98. The actual setting of the "tens" disc 91 will be indicated at all times by the pointer knob (attached to shaft 92) and the scale associated therewith.

Refer again to FIG. 1. If the pulses per gallon of flowmeters 26 and 43 are the same, then the actual percentage (of the total flow rate) for each component fluid B or A will be its switch setting (on 12 or 13, respectively) divided by the total of both switch settings. It is convenient but not necessary to adjust (manually) the percentage switches 12 and the APC unit 13 so that the total of both settings is one hundred. In this case, of course, the percentage of each component is read directly.

Assume that the switches of unit 13 are initially manually set at "65" and the percentage switches 12 at "35." At some later time, due to a change in the physical characteristic measured at 48, the APC unit 13 may have automatically reset (increased, or moved in the "up" direction) to "66." Now, the total of both settings is no longer one hundred. However, the actual proportion of fluid A in the blend is now 66/101; while this is, of course, not the same as 66% of fluid A in the blend, it does represent an increase from 65%. If the APC unit, originally manually set at "65," resets automatically (decreases, or moves in the "down" direction) to "64," the actual proportion of fluid A in the blend becomes 64/99; while this is, of course, not the same as 64% of fluid A in the blend, it does represent a decrease from 65%.

If it is desirable to at all times maintain the total of all the settings of all switch units connected to the output of pulse generator 1 (FIG. 1) at one hundred, the following modification may be effected. A second APC unit (similar in all essential respects to unit 13 described, but not including items 70–74 and 77) could be switched in to control fluid $B_2$ or any other fluid, such that its percentage setting would automatically be changed at the same time as unit 13, and in the opposite direction. This is easily done by connecting the pulse motor of this second APC unit in parallel to the output of motor control circuit 50 of FIG. 4, but oppositely to the connection of pulse motor 51. Thus, when pulse motor 51 is stepped in one direction, the pulse motor of the second APC unit would be stepped in the opposite direction. This would maintain the original setting total of 100%.

When the APC unit 13 is being manually set, it is generally preferable to set the "units" disc 80 first, to eliminate the possibility of having to go back and reset the "tens" disc 91. For example, assume that the "tens" disc 91 is first set to its proper value, say "60." Then, in the process of setting the "units" disc 80 to its proper value, say "5," it is possible that this latter disc would be rotated from the "9" position to the "zero" position, or vice versa; this would cause the "tens" disc 91 to be stepped around one position through the Geneva movement 97, 99 etc. as previously described, it being remembered that the motor shaft 66 (and also, of course, plate 94) is geared directly to disc 80 and shaft 81, and therefore rotates along with the latter shaft. This stepping of the "tens" disc 91 by manual setting of the "units" disc 80 would bring the former to an improper value, necessitating a manual resetting thereof by the knob on shaft 92 (after the "tens" disc 91 has previously been set by this same knob to its proper value). This duplication of effort is absolutely avoided if the "units" disc 80 is set to its proper value before ever touching the "tens" disc 91.

Figure 7:
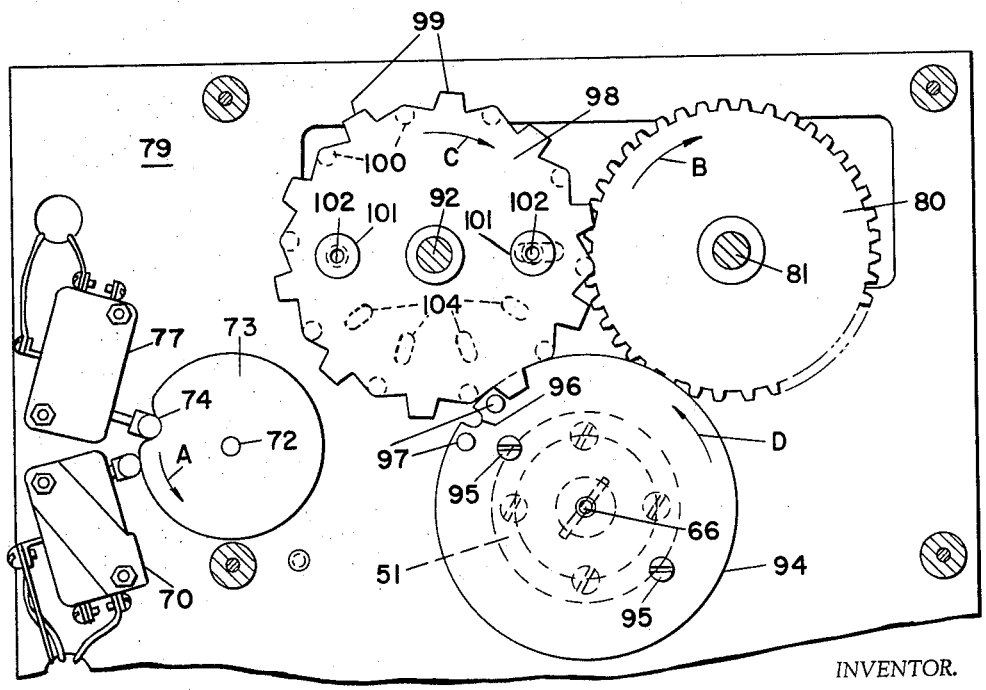
FIG. 7 is a front view of the APC unit, taken along line 7—7 of FIG. 5.

In FIG. 7, as in FIG. 6, the elements are shown in the "zero" position. For automatic stepping in the "up" direction, the shaft 66 of the pulse motor 51 rotates gear wheel 93 and plate 94 in the direction D, causing the "units" cam disc 80 to rotate (through the 1:1 ratio gear drive) in the direction B for "up" and causing the driving plate 98 (and also the "tens" cam disc 91), after substantially one complete revolution of plate 94 in direction D, to step (through the Geneva movement) in the direction C for "up." For automatic stepping in the "down" direction, the pulse motor rotates gear wheel 93 and plate 94 in the direction opposite to D, causing the "units" cam disc 80 to rotate in the direction opposite to B and the "tens" cam disc 91 to intermittently step in the direction opposite to C.

The synchronous timer motor 71 is mounted on the rear face of plate 79, and its geared-down output shaft 72 (see FIG. 7) extends forwardly, through plate 79. Cam disc 73 is secured to the forward end of this shaft, and operates the switches 70 and 77 in the manner previously described in connection with FIG. 4. Switches 70 and 77 are mounted on the front face of plate 79, in a position such that their actuating rollers can be operated by cam 73. The illustrations in FIG. 7 of the switches 77 and 70, the cam 73, the cam notch 74, and the direction of rotation A of disc 73, all corresponds to the schematic showing in FIG. 4, and this showing represents the "rest" position of the disc 73, with the timer motor 71 unenergized (switch 77 being open).

The invention claimed is:

1. A fluid flow control device, including: a conduit for conveying a fluid; a pulse generator operating to generate a train of pulses during a time interval; a controller including a selector switch means, steppable to different positions, receptive of pulses from said pulse generator, and acting to deliver from said pulse train a different integral number of pulses for each position of said switch means; control means responsive to the pulses delivered by said switch means, for controlling the fluid flow in said conduit, said flow affecting a measured physical characteristic associated with a blend of fluids of which said fluid forms a component; means for sensing variations from a predetermined value in said measured physical characteristic; and means operated by said sensing means, upon the occurrence of a variation in said physical characteristic from said value, to automatically step said switch means to a new position such as to reduce the extent of said variation.

2. A device as set forth in claim 1, wherein the sensing means comprises a viscometer for sensing a viscosity associated with said blend of fluids.

3. A device as defined in claim 1, wherein the switch means is manually adjustable in position, to thereby establish an initial fluid flow in said conduit.

4. A fluid flow control system, including: a first conduit for conveying a first fluid; a pulse generator operating to generate a train of pulses during a time interval; a controller including manually adjustable selector switch means receptive of pulses from said pulse generator and acting to select from said pulse train an integral number of pulses which depends upon the position of said switch means, for controlling the fluid flow in said conduit; a second conduit for conveying a second fluid; a controller including a selector switch means, steppable to different positions, receptive of pulses from said pulse generator, and acting to deliver from said pulse train a different integral number of pulses for each position of said steppable selector switch means; control means responsive to the pulses delivered by said switch means, for controlling the fluid flow in said second conduit; a third conduit joined to said first and second conduits for blending said first and second fluids; said last-mentioned fluid flow affecting a measured physical characteristic of the blended fluid; means coupled to said third conduit for sensing variations from a predetermined value in said measured physical characteristic; and means operated by said sensing means, upon the occurrence of a variation in said physical characteristic from said value, to automatically step said steppable selector switch means to a new position such as to reduce the extent of said variation.

5. A system as set forth in claim 4, wherein the sensing means comprises a viscometer for sensing the viscosity of the blended fluid.

6. A system as defined in claim 4, wherein the steppable selector switch means is manually adjustable in position, to thereby establish an initial fluid flow in said second conduit.

References Cited by the Examiner

UNITED STATES PATENTS

| | | | |
|---|---|---|---|
| 2,314,152 | 3/1943 | Mallory | 137—486 X |
| 2,349,521 | 5/1944 | Schmidt | 137—501 X |
| 2,632,144 | 3/1953 | Borell | 323—69 |
| 2,662,547 | 12/1953 | Comeau | 137—468 |
| 2,675,020 | 4/1954 | Breitweiser | 137—468 |
| 2,883,343 | 4/1959 | Favre et al. | 137—93 X |
| 3,025,232 | 3/1962 | Jones | 137—92 X |

ISADOR WEIL, *Primary Examiner.*

MARTIN P. SCHWADRON, *Examiner.*

R. MASSENGILL, D. LAMBERT, *Assistant Examiners.*